United States Patent [19]

Rudolph, deceased et al.

[11] 4,427,399
[45] Jan. 24, 1984

[54] OVERLOAD COUPLING OR CLUTCH

[76] Inventors: Rome R. Rudolph, deceased, late of Gibsonia, Pa.; by Kathleen Rudolph, executrix, 4113 Lee Rd., Gibsonia, Pa. 15044

[21] Appl. No.: 298,931

[22] Filed: Sep. 3, 1981

[51] Int. Cl.³ .................. F16D 7/00; F16D 43/20
[52] U.S. Cl. .................... 464/38; 192/56 R
[58] Field of Search .............. 464/30, 37, 38; 192/56 R

[56] References Cited

U.S. PATENT DOCUMENTS

| | | | |
|---|---|---|---|
| 2,781,882 | 2/1957 | Burkhardt | 464/37 X |
| 2,818,712 | 1/1958 | Barnes et al. | 464/38 X |
| 3,282,387 | 11/1966 | Becker et al. | 464/38 X |
| 3,379,034 | 4/1968 | Gustafson | 464/38 |
| 3,546,897 | 12/1970 | Kenney | 192/56 R |
| 3,722,644 | 3/1973 | Steinhagen | 192/56 R |
| 3,893,553 | 7/1975 | Hansen | 192/56 R |
| 3,924,421 | 12/1975 | Dehne et al. | 464/37 X |
| 3,930,382 | 1/1976 | Timtner | 464/38 X |

*Primary Examiner*—Stuart S. Levy
*Assistant Examiner*—Daniel P. Stodola

*Attorney, Agent, or Firm*—Thomas H. Murray; Clifford A. Poff

[57] ABSTRACT

An overload clutch or coupling includes a hub section connected to one drive element and a housing connected to another drive element. Plungers are fitted in sockets in the housing such that the shank portions of the plungers project from one side of the housing and conical end faces project from the other side of the housing where they engage with plunger seats on the hub. The hub has pull pin sockets that receive spring-biased pull pins and apply a force to a pressure plate that acts on the projecting shank portions of the plungers to maintain them in the plunger seats. The plungers are displaced from the seats when the torque between the hub and housing exceeds the maximum torque to be transmitted by the coupling or clutch. The housing can slide along the plungers to accommodate floating movement between the driven and driving parts of the clutch or coupling. A keeper plate is attached to the hub to retain the housing against such floating axial movement when desired. A pinion gear carried by a clamp ring attached to the hub meshes with a hub gear for index positioning.

9 Claims, 6 Drawing Figures

OVERLOAD COUPLING OR CLUTCH

BACKGROUND OF THE INVENTION

This invention relates to a coupling or clutch embodying a construction of parts to prevent an overload to the transmission of torque in a drive train. More particularly, the present invention relates to such a clutch or coupling of a detent-type wherein plungers are slideably supported in a housing part to engage with seats in a hub part under the force of spring-biased pull pins supported by the hub part to deliver a resilient force to the drive plungers via a pressure plate. When desired, axial floating between machine elements can be accommodated by sliding movement between the housing and hub of the clutch or coupling as well as a geared phase adjustment between the housing and hub.

Various designs of a clutch or coupling used for an overload torque-limiting function are known in the art. In U.S. Pat. No. 3,924,421, for example, a cam plate is mounted on a driving member and a driven member is connected to a cam follower on a pivot lever. The follower engages with a seat in the cam under an applied force by a spring acting on the lever. The cam follower moves from the seat of the cam when an overload occurs whereby the driving member rotates relative to the driven member. The cam follower and cam are located in a lubricant-filled cavity formed in a housing which is supported by anti-friction bearings on the driven and driving members.

In U.S. Pat. No. 3,282,387, there is disclosed a detent-type overload clutch having buttonhead plungers engaged with compression springs arranged so that the buttonhead portions of the plungers will move out of conical seats when an overload occurs. The conical seats are formed in a wear plate that abuts against one side of a driven member and coupled thereto by a key or dowel pin. The opposite side of the driven member is engaged by a flange. A detent support plate is connected to the flange by bolts. The detent support plate is connected to a driving member such as a motor. The force of the springs acting on the buttonhead plungers is applied by the flange to a broad surface area of the driven member. The frictional engagement between the flange and the driven member contributes to the torque-transmitting ability by the clutch. The maximum torque the clutch will transmit before disengagement takes place can be changed by changing the spring force and will vary with a change to the coefficient of friction between the flange and driven member due to temperature, humidity, deterioration of the friction surfaces and the like. Thus, erratic changes occur to the value of the maximum torque at which the clutch transmits before disengagement takes place. A detent clutch of this type cannot accommodate relative axial movement between the machine elements to which it is connected. When the possibility of axial movement is excluded by the design of the clutch, it must accommodate forces in an axial direction. These forces are applied in such a way to alter the spring pressure and adversely affect reliance on friction.

SUMMARY OF THE INVENTION

It is an object of the present invention to provide an overload coupling or clutch in which a spring force is self-contained within one part of the clutch or coupling to retain drive plungers carried by the other part of the clutch or coupling against seat surfaces carried by the first of the coupling or clutch parts until the transmission of a maximum torque is exceeded before disengagement takes place.

It is a further object of the present invention to provide an improved overload clutch or coupling embodying a design wherein driven and driving parts are free to move due to an axially-directed thrust by a self-contained arrangement of spring-biased pull pins separate and apart from detent plungers.

It is a still further object of the present invention to provide an overload clutch or coupling wherein driven and driving parts can float in an axial direction with respect to the rotational axis of the machine elements to which they are connected without upsetting or changing the maximum torque which the clutch transmits before disengagement takes place.

It is another object of the present invention to provide an improved overload clutch or coupling embodying a construction of parts that permits the use of common or standard split, tapered bushings for attaching shafts to either or both of the driven and driving members as well as flange mounting to flat shoulder surfaces.

It is a still further object of the present invention to provide an improved overload clutch or coupling wherein driven and driving parts may be used interchangeably whereby either part can be driven or driving.

More particularly, according to the present invention there is provided an overload clutch or coupling comprising a housing having a plurality of plunger sockets generally parallel with and radially dispersed about a rotational axis about which said housing can rotate, a plurality of plungers each slideable lengthwise is one of said plunger sockets such that a conical end face on each plunger projects from one side of the housing while a shank portion of a plunger projects from the opposite side of the housing, hub means having a plurality of plunger seats each aligned to engage with the conical end face of one of the plungers, the hub means being rotatable about the rotational axis, a plunger plate for engaging the shank portions of the plungers projecting from the housing, the hub means further having a plurality of pull pin sockets distinct and apart from the plunger sockets, a plurality of spring-biased pull pins each supported by the hub means in one of the pull pin sockets to engage with the pressure plate for directing a torque-limiting force against the drive plungers to maintain the conical ends thereof engaged in the seats of the hub.

When desired, the aforementioned hub means is designed to permit rotation of the hub with respect to the housing for indexing. For this purpose, the hub means includes a mounting hub, gear means on the mounting hub, a hub ring carrying the plunger seats for support by the mounting hub, and a pinion gear supported by the hub ring to mesh with the gear means for rotatably indexing the mounting hub relative to the hub ring. The hub means may include a mounting hub having a central bore with a divided side wall and fastening means for clamping the mounting hub onto a drive element. The housing and the hub means each preferably includes guide surfaces for relative floating movement therebetween along the rotational axis. Such floating movement can be prevented by the use of a retaining plate.

These features and advantages of the present invention as well as others will be more readily understood when the following description of a preferred embodi- BRIEF DESCRIPTION OF THE DRAWINGS (cont.)

Figure 3:
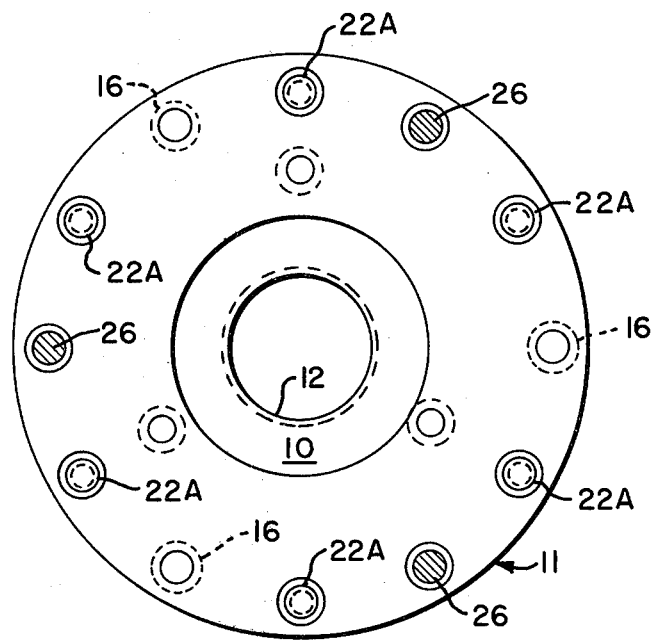
FIG. 3 is a rear sectional view taken along line III—III of FIG. 2.
Figure 2:
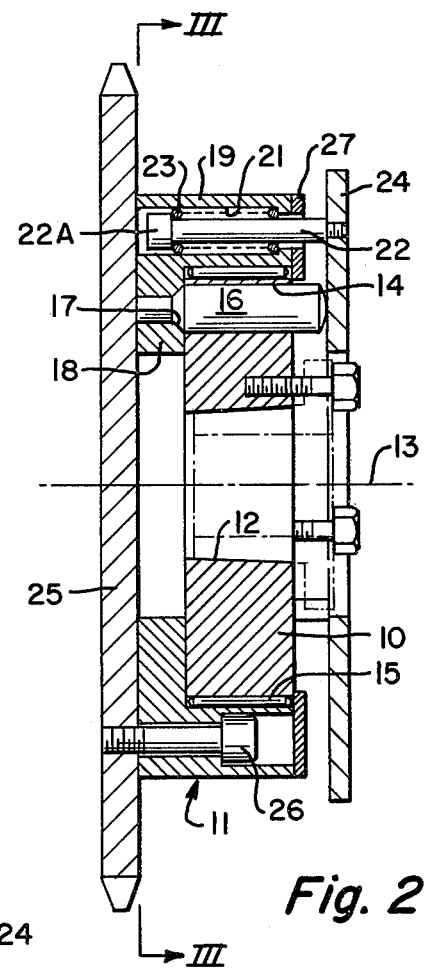
FIG. 2 is a sectional view taken along line II—II of FIG. 1.
Figure 1:
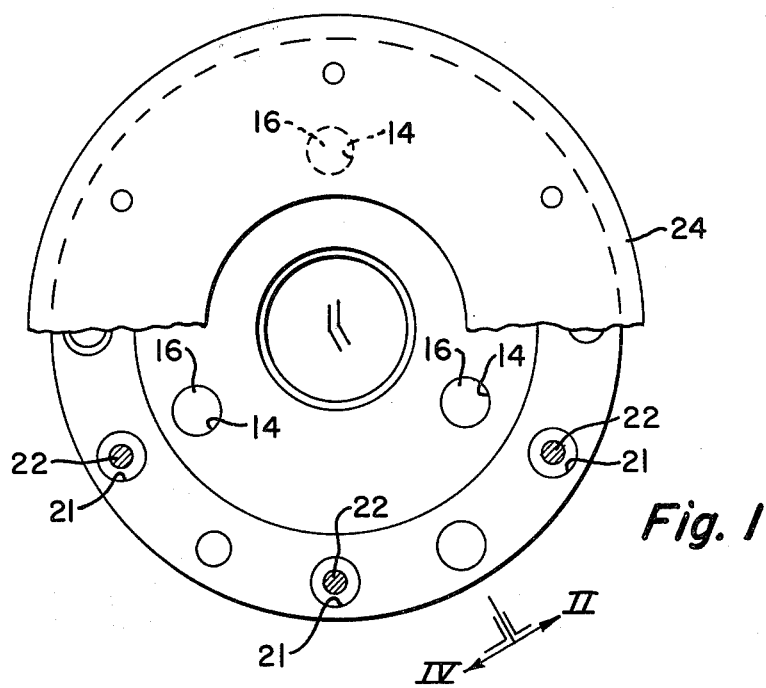
FIG. 1 is a front view of an overload clutch according to one embodiment of the present invention.

In FIGS. 1–3, there is illustrated an overload clutch wherein a housing 10 has an annular construction to fit within a counterbore in a hub means 11. According to the present invention, either the housing or the hub means can be driven. For the purpose of the following description of the overload clutch, the housing 10 is considered the driven member and the hub means 11 is considered the driving member. The housing 10 has a tapered bore 12 to receive split, taperd bushings for attaching a drive shaft, not shown, thereto. In place of the tapered bore 12, other well-known forms of drive connections can be used without departing from the spirit of the present invention. The housing has a central rotational axis identified by the reference numeral 13 and a plurality of plunger sockets 14 in the form of parallel bored openings dispersed at different radii from axis 13, which is best shown in FIGS. 1 and 2, when single positioning is required or necessary. Otherwise, the bores can be at the same radii. It is preferred, although not essential, to provide an anti-friction bearing 15 between the outer edge of the housing 10 and the counterbore in the hub means 11. The bearing reduces detrimental effects due to friction for determining the maximum torque which the clutch is to transmit before disengagement occurs between the housing and the hub means.

According to the present invention, plungers 16 are arranged for longitudinal sliding movement in the plunger sockets 14 such that conical end portions of the plungers engage in conical end faces or seats 17. The end faces are dispersed at same radii at sites corresponding to the plungers 16. The arrangement of parts is such that the conical end face of a plunger will engage only in one of the plunger seats. In the embodiment of the overload clutch shown in FIGS. 1–3, three plungers are used, although two plungers can be used or more than three can be used without departing from the spirit of the present invention. The plunger seats are formed in a flange section 18 which is joined to a hub section 19, both of which form part of the hub means 11. Pull pin sockets 21 are disposed concentrically about the rotational axis 13 at spaced-apart locations about the peripheral edge portion of the hub section 19. Six pull pin sockets are shown in FIG. 3. In each socket, there is a pull pin 22. A compression spring 23 surrounds a shank portion of a pull pin to impose a biasing force to an enlarged head portion 22A of the pull pin. The spring in each socket 21 seats against an end wall in the hub section. The pull pins have threaded end portions that engage with a pressure plate 24 such that the aggregate spring force transmitted by the pull pins is applied to shank portions of the plungers that project from the side of housing 10 which is opposite the side of the housing from which the conical end faces of the plungers project. By this arrangement of parts, the force of the compression springs is self-contained within the hub means 11 without requiring a force path through the housing 10. In other words, the housing 10 is not clamped to the hub means by application of the force of springs 23. This eliminates a force factor necessary to overcome a thrust force, thus increasing the accuracy and dependability to the selection of a maximum torque which the coupling is to transmit.

The plungers are physically separated from springs which force the plungers against seat surfaces. This assures that only the plungers ride on the seat surfaces. By providing that the housing fits within the counterbore in the hub means guided axial movement is achieved. The use of the antifriction bearing 15 minimizes radial friction and eliminates thrust friction. A drive output member 25 takes the form of a sprocket wheel affixed to the hub means by bolts 26. The hub means may be connected to a gear, dial plate or other drive elements by bolts or other forms of attachment. In FIGS. 1–3, a keeper plate 27 is shown to prevent relative axial sliding movement between the housing and the hub means. The keeper plate is attached to the hub means by bolts, not shown. The keeper plate can either be discarded or the central bore increased so that the housing can slide in the hub means for accommodating axial sliding movement within a limit established by the distance which the housing means can slide along the plungers between the pressure plate 24 and the flange section 18. In the embodiment of the present invention shown in FIG. 4, the keeper plate is eliminated, whereby the housing 10 can float, i.e., move in a direction along the rotational axis toward or away from the hub flange 18. Such floating movement occurs without detriment to the operation of the overload clutch or coupling of the present invention since the hub merely slides along the plungers which are held in the plunger seats by the force of springs 23. This force is independent of the position of the housing.

Figure 4:
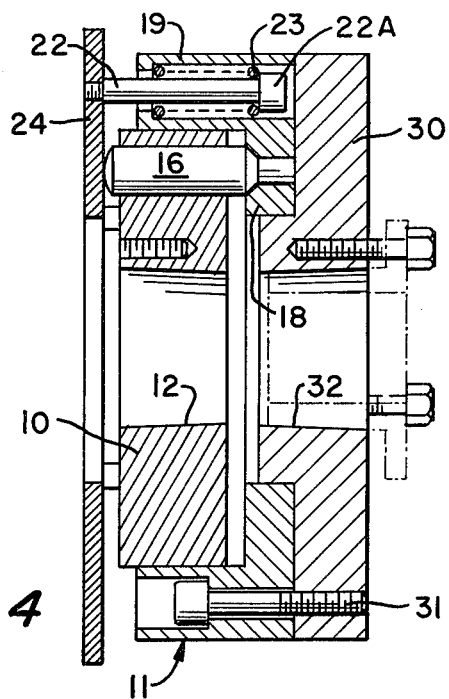
FIG. 4 is a sectional view similar to FIG. 2 but illustrating an overload coupling wherein an axial floating occurs between driven and driving clutch parts.

The embodiment of FIG. 4 further provides for the use of a hub 30 attached to the hub section by bolts 31. The hub 30 has a tapered bore 32 to receive split tapered bushings for attachment to a shaft or mounting to a flat shoulder surface. In FIG. 4, the housing 10, hub means 11, plungers 16, pull pins 22 and pressure plate 24 have been identified with the same reference numerals used previously to identify these parts in FIGS. 1–3 since their construction and relationship are the same.

Figure 5:
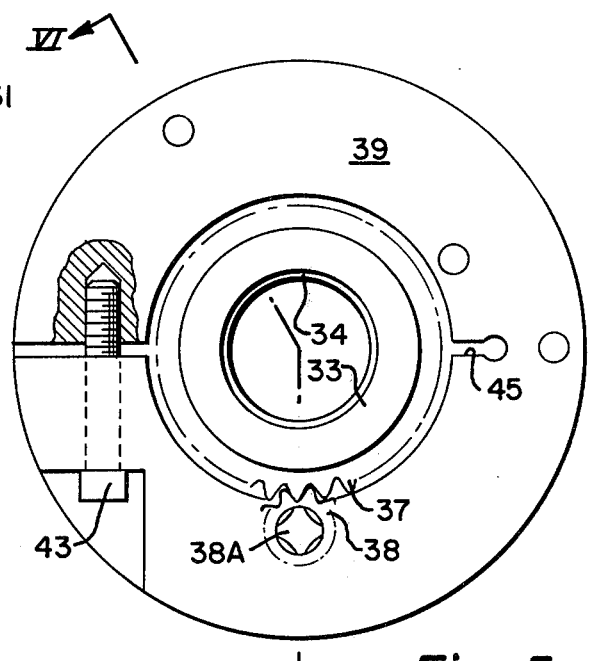
FIG. 5 is a front view of an overload coupling embodying parts for a phase adjustment between driven and driving members according to the present invention.
Figure 6:
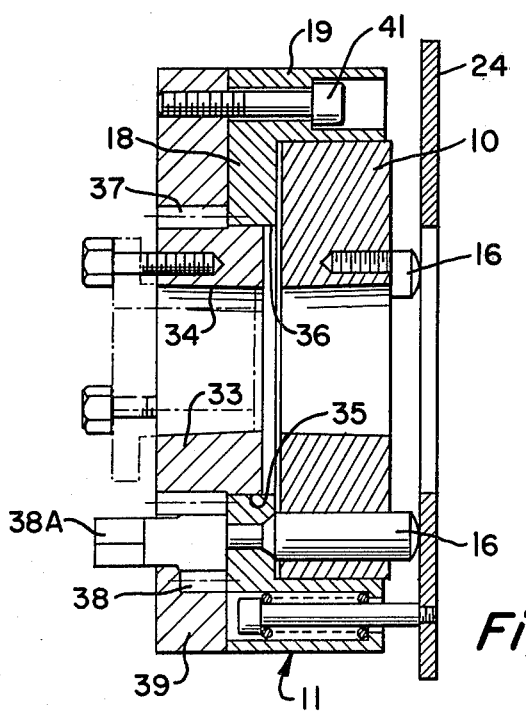
FIG. 6 is a sectional view taken along line VI—VI of FIG. 5.

FIGS. 5 and 6 illustrate a further embodiment of the present invention wherein an overload coupling includes an arrangement of parts for adjusting the phase relation between the driven and driving members to which the coupling parts are connected. The same reference numerals are used to identify the same parts in the embodiment of FIGS. 1–3 and the embodiment of FIGS. 6 and 7. The flange section 18 and hub section 19 of the hub means 11 are mounted for rotation relative to a gear hub 33. The gear hub forms a mounting hub and has a tapered bore 34 for attachment to a shaft by the use of split tapered bushings. The hub gear has an outer shoulder surface 35 which seats against a journal surface 36 of hub flange 18. Hub gear 33 has gear teeth 37 forming a spur gear that meshes with gear teeth of a pinion gear 38. The pinion gear is rotatably supported by a hub ring 39 attached to the hub section 19 by bolts 41. A squared end portion 38A of the pinion gear projects from the ring such that the pinion gear can be rotated by means of a suitable wrench whereby hub gear 33 rotates relative to the ring. The shaft of a machine element to which the hub gear 33 is secured is rotatably indexed relative to the shaft of a machine element to which housing 10 is secured. After the desired angular relationship between hub gear 33 and housing 10 is established, the ring 39 is clamped to the hub gear. For this purpose as shown in FIG. 5, the hub gear 33 is split by a radial saw cut in one wall section and a clamp bolt 43 is arranged to span the gap formed by the saw cut and extends into a tapped hole in the wall section of the ring. The bolt 43 is torqued to a desired extent to clamp the ring to the gear hub. The clamping action is such that the teeth of the pinion gear 38 are jammed against the teeth 37 of the gear hub, thereby preventing relative rotation between these parts. To facilitate this clamping action, it is desirable to form a short radial saw cut 45 in a ring side wall section which is diametrically opposite the saw cut acted on by bolt 33.

Although the invention has been shown in connection with certain specific embodiments, it will be readily apparent to those skilled in the art that various changes in form and arrangement of parts may be made to suit requirements without departing from the spirit and scope of the invention.

It is claimed:

1. An overload coupling or clutch comprising a housing having a plurality of plunger sockets generally parallel with and radially dispersed about a rotational axis about which said housing can rotate, a plurality of plungers each slideable lengthwise in one of said plunger sockets such that a conical end face on each plunger projects from one side of said housing while a shank portion of the plunger projects from the opposite side of the housing, hub means having a plurality of plunger seats each aligned to engage with the conical end face of one of said plungers, said hub means being rotatable about said rotational axis, a pressure plate for engaging with shank portions of said plungers projecting from said housing, said hub means further having a plurality of pull pin sockets distinct and apart from said plunger sockets, and a plurality of spring-biased pull pins each having a spring supported in one of said pull pin sockets by said hub means, said pull pins being engaged with said pressure plate for directing a torque-limiting force against said plungers to maintain the conical end faces thereof engaged in the seats of said hub means.

2. The overload coupling or clutch according to claim 1 wherein said housing and said hub means include guide surfaces for relative floating movement therebetween along said rotational axis.

3. The overload coupling or clutch according to claim 1 further including anti-friction bearing means between said housing and said hub means for relative rotation therebetween about said rotational axis.

4. The overload coupling or clutch according to claim 1 or 3 wherein said hub means includes a mounting hub, gear means on said mounting hub, a hub ring carrying said plunger seats for support by said mounting hub, and a pinion gear supported by said hub ring to mesh with said gear means for rotatably indexing the mounting hub relative to said hub ring.

5. The overload coupling or clutch according to claim 1 wherein said hub means includes a mounting hub having a central bore with a divided side wall, and fastening means for clamping said mounting hub onto a drive element.

6. The overload coupling or clutch according to claim 1 wherein said spring-biased pull pins each includes a shank with an enlarged head at one end and threads at the other end for attachment to said pressure plate, said spring comprising a compression spring for urging said pressure plate toward said hub means.

7. The overload coupling or clutch according to claim 6 wherein the plunger openings in said housing are constructed to permit movement of said housing along said plungers between said hub means and said pressure plate while said plungers are urged into said plunger seats.

8. The overload coupling or clutch according to claim 1 further including retaining means to prevent relative movement between said housing and said hub means along said rotational axis.

9. The overload coupling or clutch according to claim 1 wherein said housing has a tapered bore for engagement with a drive element.

* * * * *